(12) United States Patent
Mani et al.

(10) Patent No.: US 7,552,352 B2
(45) Date of Patent: Jun. 23, 2009

(54) SYNCHRONIZATION OF SIGNALS

(75) Inventors: Murali Mani, Chappaqua, NY (US);
Richard Chi-Te Shen, Leonia, NJ (US);
Alan P. Cavallerano, Bedford, NY (US)

(73) Assignee: NXP B.V., Eindhoven (NL)

( * ) Notice: Subject to any disclaimer, the term of this patent is extended or adjusted under 35 U.S.C. 154(b) by 433 days.

(21) Appl. No.: 10/536,647

(22) PCT Filed: Nov. 26, 2003

(86) PCT No.: PCT/IB03/05440

§ 371 (c)(1),
(2), (4) Date: May 27, 2005

(87) PCT Pub. No.: WO2004/052020

PCT Pub. Date: Jun. 17, 2004

(65) Prior Publication Data

US 2006/0053455 A1    Mar. 9, 2006

Related U.S. Application Data

(60) Provisional application No. 60/430,919, filed on Dec. 4, 2002.

(51) Int. Cl.
*G06F 1/12* (2006.01)
*G06F 13/42* (2006.01)

(52) U.S. Cl. .................. 713/400; 713/401; 348/194; 348/500; 348/513

(58) Field of Classification Search ............... 713/400, 713/401; 348/194, 500, 513
See application file for complete search history.

(56) References Cited

U.S. PATENT DOCUMENTS

| | | | | |
|---|---|---|---|---|
| 4,180,829 A | * | 12/1979 | Pires | ............... 348/192 |
| 5,506,932 A | * | 4/1996 | Holmes et al. | ............ 704/205 |
| 5,844,600 A | | 12/1998 | Kerr | |
| 5,953,049 A | | 9/1999 | Mane et al. | |
| 6,285,405 B1 | * | 9/2001 | Binford et al. | ............ 348/512 |
| 6,452,974 B1 | * | 9/2002 | Menon et al. | ......... 375/240.28 |
| 6,741,795 B1 | * | 5/2004 | Takehiko et al. | ............ 386/95 |
| 7,194,676 B2 | * | 3/2007 | Fayan et al. | .............. 715/203 |
| 2002/0103919 A1 | | 8/2002 | Hannaway | |
| 2002/0140859 A1 | | 10/2002 | Kariatsumari | |
| 2004/0234250 A1 | * | 11/2004 | Cote et al. | .............. 386/96 |

FOREIGN PATENT DOCUMENTS

EP 1259082 11/2002
WO WO02060178 8/2002

* cited by examiner

*Primary Examiner*—Thomas Lee
*Assistant Examiner*—Michael J Brown

(57) ABSTRACT

A method and system for synchronizing signals. First and second signals are sent (compressed or uncompressed) from a source to a receiving apparatus of a receiving system. The first signal has content of a first modality (e.g., audio) and the second signal has content of a second modality (e.g., video). The first and second signals are to be displayed on a display apparatus of the receiving system. The first and second signals have been time-synchronized at the source. If the first and second signals are not synchronized in time when received at the receiving apparatus, then the first and second signals may be time-synchronized at the receiving apparatus either manually or through timestamping of both signals at the source, in conjunction with use of a real-time clock at the receiving apparatus.

28 Claims, 5 Drawing Sheets

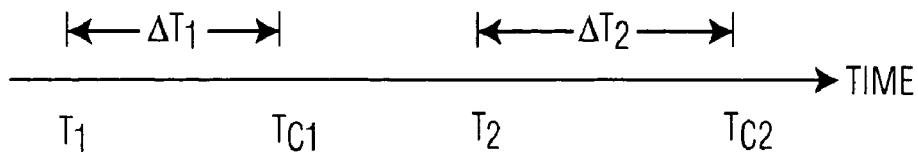

FIG. 5

TIMESTAMP CONTENTS BASED ON SIGNAL FORMAT

| SIGNAL FORMAT | CONTENTS OF TIMESTAMP |
|---|---|
| UNCOMPRESSED | A TIME READ FROM CLOCK $C_S$ AT SOURCE, THE TIME CORRESPONDING TO A LOCATION IN THE SIGNAL AT WHICH THE TIME STAMP IS POSITIONED |
| COMPRESSED | 1) A TIME READ FROM CLOCK $C_S$ AT SOURCE, THE TIME CORRESPONDING TO A LOCATION IN A AN UNCOMPRESSED SIGNAL WHICH WAS COMPRESSED AT THE SOURCE TO FORM THE SIGNAL; AND<br><br>2) AN IDENTIFICATION OF SAID LOCATION IN THE UNCOMPRESSED SIGNAL |

FIG. 6

EXAMPLES OF SIGNAL MODALITY COMBINATIONS

| EXAMPLE | MODALITY OF FIRST SIGNAL $S_1$ | MODALITY OF SECOND SIGNAL $S_2$ |
|---|---|---|
| 1 | VIDEO | AUDIO |
| 2 | VIDEO | TEXT |
| 3 | AUDIO | TEXT |

FIG. 7

SYNCHRONIZATION OF SIGNALS

Cross Reference to Related Cases

Applicants claim the benefit of Provisional Application Ser. No. 60/430,919, filed Dec. 4, 2002.

The present invention relates to a method and system for synchronizing signals.

A practical technology for generally synchronizing audio and video signals transmitted from a sender to a receiver does not exist. Thus there is a need for a method and system to generally synchronize audio and video signals transmitted from a sender to a receiver.

The present invention provides a method for synchronizing signals, comprising:
receiving, from a source, a first signal and a second signal by a receiving apparatus of a receiving system, the first and second signals to be displayed on a display apparatus of the receiving system, the first and second signals having been time-synchronized at the source, the first signal having content of a first modality, the second signal having content of a second modality;
displaying on the display the first and second signals, said displayed first and second signals being accessible to a user; and
manually reducing, by the user, the time rate of displaying one of the first signal and the second signal, said manually reducing being directed to time-synchronizing said displaying of the first and second signals on the display apparatus.

The present invention provides a system for synchronizing signals, comprising:
receiving means for receiving, from a source, a first signal and a second signal by a receiving apparatus of a receiving system, the first and second signals to be displayed on a display apparatus of the receiving system, the first and second signals having been time-synchronized at the source, the first signal having content of a first modality, the second signal having content of a second modality;
display means for displaying on the display the first and second signals, said displayed first and second signals being accessible to a user; and
manual reducing means for manually reducing, by the user, the time rate of displaying one of the first signal and the second signal, said manually reducing being directed to time-synchronizing said displaying of the first and second signals on the display apparatus.

The present invention provides a method for synchronizing signals, comprising:
receiving, from a source, a first signal and a second signal by a receiving apparatus of a receiving system, the first and second signals to be synchronously displayed on a display apparatus of the receiving system, the first and second signals having been time-synchronized at the source, the first signal having content of a first modality and a first plurality of time stamps originating from the source, the second signal having content of a second modality and a second plurality of time stamps originating from the source, the second plurality of time stamps being synchronized with the first plurality of time stamps;
determining at a plurality of times on a real-time clock CR at the receiving system whether the first and second signals are time-synchronized relative to the clock CR, said determining being based on analyzing the first and second plurality of time stamps in relation to the clock CR; and
reducing the time rate of displaying one of the first signal and the second signal when said determining determines that the first and second signals are not time-synchronized relative to the clock CR such that the one is time advanced relative to the remaining other of the first signal and the second signal, said reducing being directed to time-synchronizing said displaying of the first and second signals on the display apparatus.

The present invention provides a system for synchronizing signals, comprising:
receiving means for receiving, from a source, a first signal and a second signal by a receiving apparatus of a receiving system, the first and second signals to be synchronously displayed on a display apparatus of the receiving system, the first and second signals having been time-synchronized at the source, the first signal having content of a first modality and a first plurality of timestamps originating from the source, the second signal having content of a second modality and a second plurality of timestamps originating from the source, the second plurality of time stamps being synchronized with the first plurality of time stamps;
determining means for determining at a plurality of times on a real-time clock CR at the receiving system whether the first and second signals are time-synchronized relative to the clock CR, said determining being based on analyzing the first and second plurality of timestamps in relation to the clock CR; and
reducing means for reducing the time rate of displaying one of the first signal and the second signal when said determining determines that the first and second signals are not time-synchronized relative to the clock CR such that the one is time advanced relative to the remaining other of the first signal and the second signal, said reducing being directed to time-synchronizing said displaying of the first and second signals on the display apparatus.

The present invention advantageously provides a method and system to generally synchronize audio and video signals transmitted from a sender to a receiver.

FIG. 5 illustrates definitions of parameters appearing in the flow chart of FIG. 4, in accordance with embodiments of the present invention.

FIG. 6 is a table describing timestamp content for uncompressed and compressed signals in conjunction with the automated system of FIGS. 3-4 in accordance with embodiments of the present invention.

FIG. 7 is a table listing signal modality combinations, in accordance with embodiments of the present invention.

Figure 1:
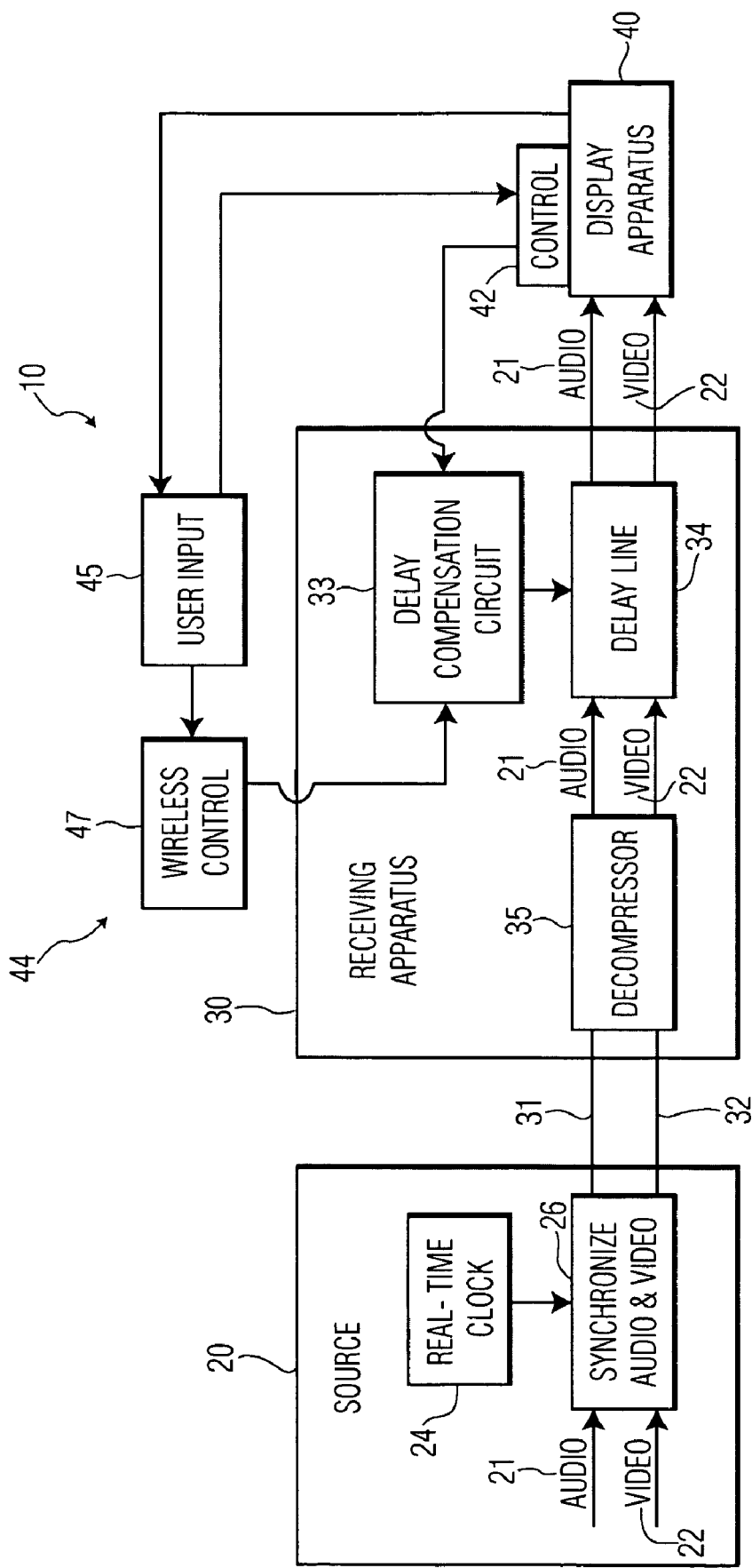
FIG. 1 is a block diagram of a system for manually synchronizing signals, in accordance with embodiments of the present invention.

The present invention discloses a manual method and system, as well as an automated method and system, for synchronizing two or more signals transmitted from a source (i.e., a sender) to a receiver on separate channels. The modality of a signal is indicative of the type of content carried by the signal. Examples of modalities include a video modality, an audio modality, and a text modality, and the signals having these modalities are called video signals, audio signals, and text signals, which carry video content, audio content, and text content, respectively. FIG. 7 is a table listing signal modality combinations as pairs of modality types wherein the different modalities of such a pair may characterize signals being transmitted from the source to the receiver on separate channels, in accordance with embodiments of the present invention. The signal modality combinations in FIG. 7 include: a video modality and an audio modality, a video modality and a text modality, and an audio modality and a text modality. Although the embodiments of the present invention are described infra in terms of synchronizing an audio signal with a video signal, or vice versa, the scope of the present invention includes synchronizing signals having any modalities. As indicated supra, the signals transmitted from the source may have different modalities (e.g., an audio modality for a first signal transmitted from the source and a video modality for a second signal transmitted from the source). Nonetheless, the scope of the present invention includes the case in which the signals transmitted from the source have the same modality (e.g., a video modality for a first signal transmitted from the source and a video modality for a second signal transmitted from the source; an audio modality for a first signal transmitted from the source and an audio modality for a second signal transmitted from the source).

The signals sent to a receiver from the source are assumed to be time-synchronized at the source in accordance; e.g., with a real-time clock at the source or studio "genlock" signals at the source. Said signals, after being sent from the source and before being received at the receiver, may be delayed in transmission due to, inter alia, process delay. For example, time delay may be caused by a signal going through many multiplex (broadcast) points; at each such broadcast point the signal may be edited, or there may be other process delay (e.g., processing due to inserting special effects into the video). Thus, the transmission path itself may change the timing of the audio and video signals differentially, since the audio and video signals travel along different transmission paths and are subject to different processing steps. As a result, the audio and video signals may not be time synchronized when the audio and video signals arrive at the receiver. The scope of the present invention includes cases in which the audio and video signals are not time synchronized when the audio and video signals arrive at the receiver, for any reason. As a first example, the audio and video signals may not be time synchronized when arriving at the receiver, because the first signal and the second signal are received at the receiver on separate channels. As a second example, the audio and video signals may not be time synchronized when arriving at the receiver, because the first signal and the second signal are received at the receiver as not multiplexed with each other. As a third example, the audio and video signals may not be time synchronized when arriving at the receiver, because the first signal and the second signal are received at the receiver as multiplexed but not time-synchronized with each other. The present invention is directed to synchronizing the audio and video signals at the receiver when the audio and video arrive out of synch at the receiver.

Figure 2:
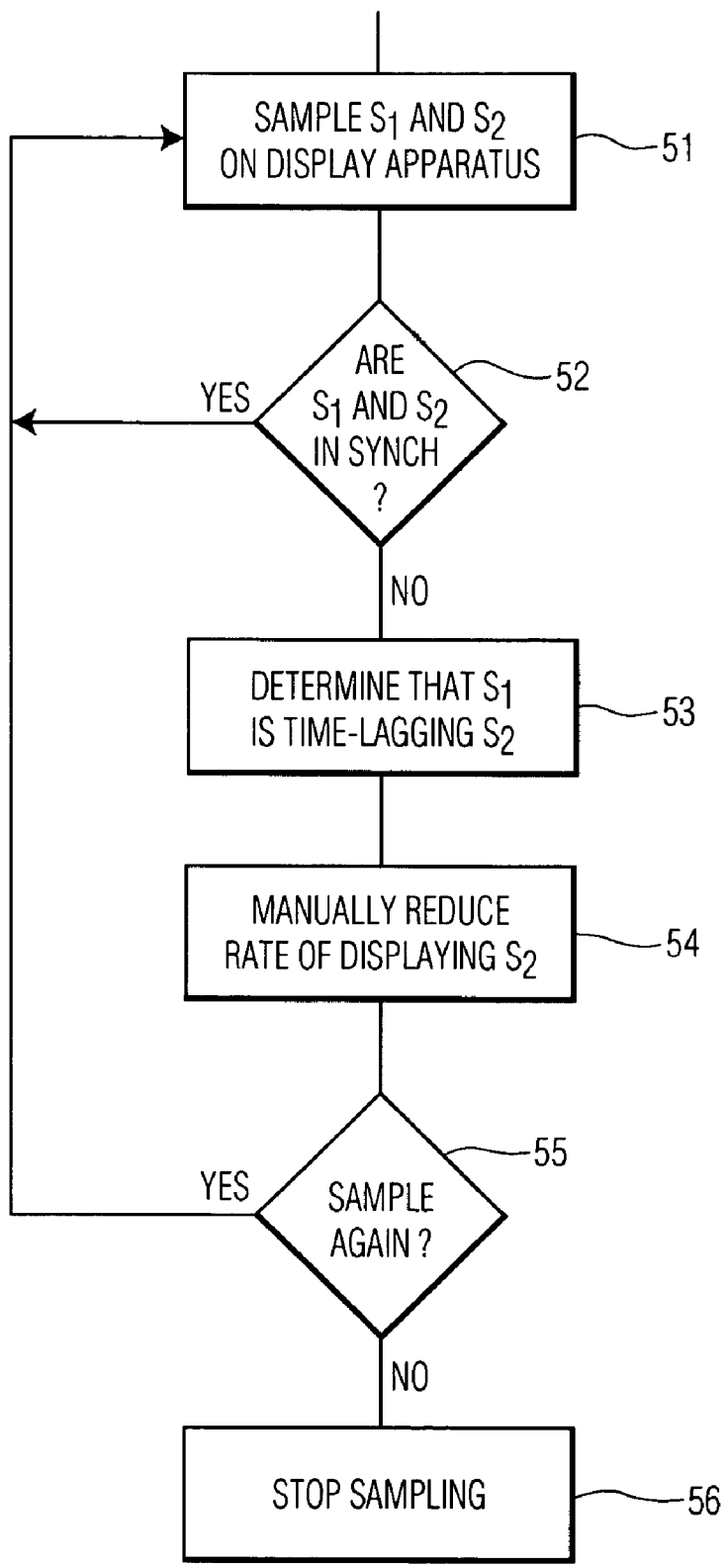
FIG. 2 is a flow chart describing manual synchronisation of signals in conjunction with the manual system of FIG. 1, in accordance with embodiments of the present invention.

FIGS. 1-2 relate to the manual method and system of the present invention for synchronizing an audio and video signal with each other. FIGS. 3-6 relate to the automated method and system of the present invention for synchronizing an audio and video signal with each other. The audio and video signals are assumed to be content related, which means that the audio and video signals are components of a common program or other presentation such as a movie or television program, so that corresponding portions of the audio and video signals are intended to be played back together as the common program or other presentation is being played back. Definitionally, the audio and video signals (or any plurality of signals having different modalities, or the same modality, for their content) are said to be synchronized if they are synchronized in time, which means that when the audio and video signals are played back, in accordance with the common program or other presentation being played back, said corresponding portions of the audio and video signals may be played back simultaneously. Thus the words "synchronize" and "time-synchronize" (and variants thereof) have the same meaning herein.

FIG. 1 is a block diagram of a system 10 for manually synchronizing signals, in accordance with embodiments of the present invention. The system 10 is adapted to receive an audio signal 21 and a video signal 22 from a source 20. The source 20 functions as a sender of the audio signal 21 on audio channel 31, and a video signal 22 on video channel 32, to the system 10. The audio signal 21 and the video signal 22 are each either in an uncompressed format or in a compressed format, as sent by the source 20 and as received by the system 10. The video signal 22 is either in an uncompressed format or in a compressed format, as sent by the source 20 and as received by the system 10. The source 10 includes a real-time clock 24 which may be used to synchronize 26 the audio signal 21 with the video signal 22, although said synchronization between the audio signal 21 and the video signal 22 may alternatively be achieved by other methods such as, inter alia, utilizing a "genlock" signal at the source 20. If either or both of the audio signal 21 and the video signal 22 are sent to the system 10 in a compressed format, the synchronization 26 between the audio signal 21 and the video signal 22 is effectuated prior to said compression.

The system 10 includes a receiving apparatus 30, a display apparatus 40 and a user apparatus 44. The receiving apparatus 30 includes a decompressor 35, a delay compensation circuit 33, and a delay line 34. The delay compensation circuit 33 is coupled to the delay line 34. As explained supra, the audio signal 21 and the video signal 22 may arrive at the receiving apparatus 30 out of time synchronization with each other.

The display apparatus 40, which may include a control 42, may be any type of apparatus known by one of ordinary skill in the art as being capable of displaying the pertinent signals. For example, the display apparatus 40 may comprise a speaker for displaying the audio signal 21. As another example, the display apparatus 40 may comprise a television screen or computer monitor for displaying the video signal 22. The display apparatus 40 is coupled to the delay line 34 of the receiving apparatus 30.

The user apparatus 44 comprises user input 45 and may additionally comprise a wireless control 47. At least one of the control 42 and the wireless control 47 must be present. Thus, the user input 45 is coupled to at least one of the control 42 and the wireless control 47. The user input 45 may transfer input from a user to the delay compensation circuit 33 through the control 42, the wireless control 47, or both.

After being received by the receiving apparatus 30, the audio signal 21 is decompressed by the decompressor 35 if the audio signal 21 was sent by the source 20 in compressed format, and the video signal 22 is decompressed by the decompressor 35 if the video signal 22 was sent by the source 20 in compressed format. Next, the audio signal 21 and the video signal 22 enter the delay line 34 where one or both of said signals are subject to being delayed or slowed down under control of the delay compensation circuit 33. The delay line 34 may include one or more buffers for storing the audio signal 21 and the video signal 22

The display apparatus 40 is adapted to display the audio signal 21 and the video signal 22. The audio signal 21 and the video signal 22 being displayed on the display apparatus 40 are accessible to a user; i.e., the audio signal 21 may be heard by the user and the and the video signal 22 may be seen by the user. The user may manually reduce the time rate of displaying the one signal (i.e., the "advanced" signal) of the audio signal 21 and the video signal 22 that is ahead of the other remaining signal (i.e., the "retarded" signal), so as to time-synchronize the displaying of the audio signal 21 and the video signal 22 on the display apparatus 40. This synchronization is accomplished by transmitting user input 45 from the user to the delay compensation circuit 33 via the control 41 on the display apparatus 40 or via the wireless control 47. The user input 45 is comprises a delay directive from a user to the delay compensation circuit 33. The control 41 and the wireless control 47 each comprise any input device or mechanism (e.g., a keyboard, mouse, turnable knob, etc) capable of transmitting the user input 45 to the delay compensation circuit 33.

The time rate of displaying the advanced signal may be reduced continuously via the delay compensation circuit 33 such as by reducing the transmission rate or display rate of the advanced signal. For example, the user may turn a knob on the control 41 or wireless control 47 such that said time rate of displaying increases as the knob is turned clockwise and said time rate of displaying decreases as the knob is turned counterclockwise. The time rate of displaying the advanced signal may alternatively be reduced discontinuously by introducing a time delay gap in the advanced signal via the delay compensation circuit 33. The time delay gap is an interval of time during which the advanced signal is held in suspension and is not being further transmitted. For example, the user may press a button that acts as a toggle switch: pressing the button a first time stops transmission of the advanced signal and pressing the button a second time resumes transmission of the advanced signal. The advanced signal is frozen within the one or more buffers of the delay line 34 for the period of the time delay gap.

FIG. 2 is a flow chart comprising steps 51-56 which describe manual synchronization of signals in conjunction with the manual system 10 of FIG. 1, in accordance with embodiments of the present invention. In step 51, the user samples the audio signal 21 (S1) and the video signal 22 (S2) by listening to audio signal 21 and viewing the video signal 22. Through said sampling, the user determines in step 52 whether the signals S1 and S2 are in synch (i.e., in synchronization with each other). If the signals S1 and S2 are in synch, then the user continues in step 51 to sample the signals S1 and S2. If and when the user determines that the signals S1 and S2 are not in synch, then the user determines in step 53 that one of the signals, namely S1 for example, is time-lagging the other signal S2. In step 54, the user manually reduces (continuously or discontinuously as described supra) the rate of displaying the signal S2 until the user is satisfied that the signals S1 and S2 are in synch. In step 55, the user decides whether to continue or stop sampling the signals S1 and S2. As a result, the user may stop sampling the signals S1 and S2 (step 56) or return to step 51 to continue to sample the signals S1 and S2.

Figure 3:
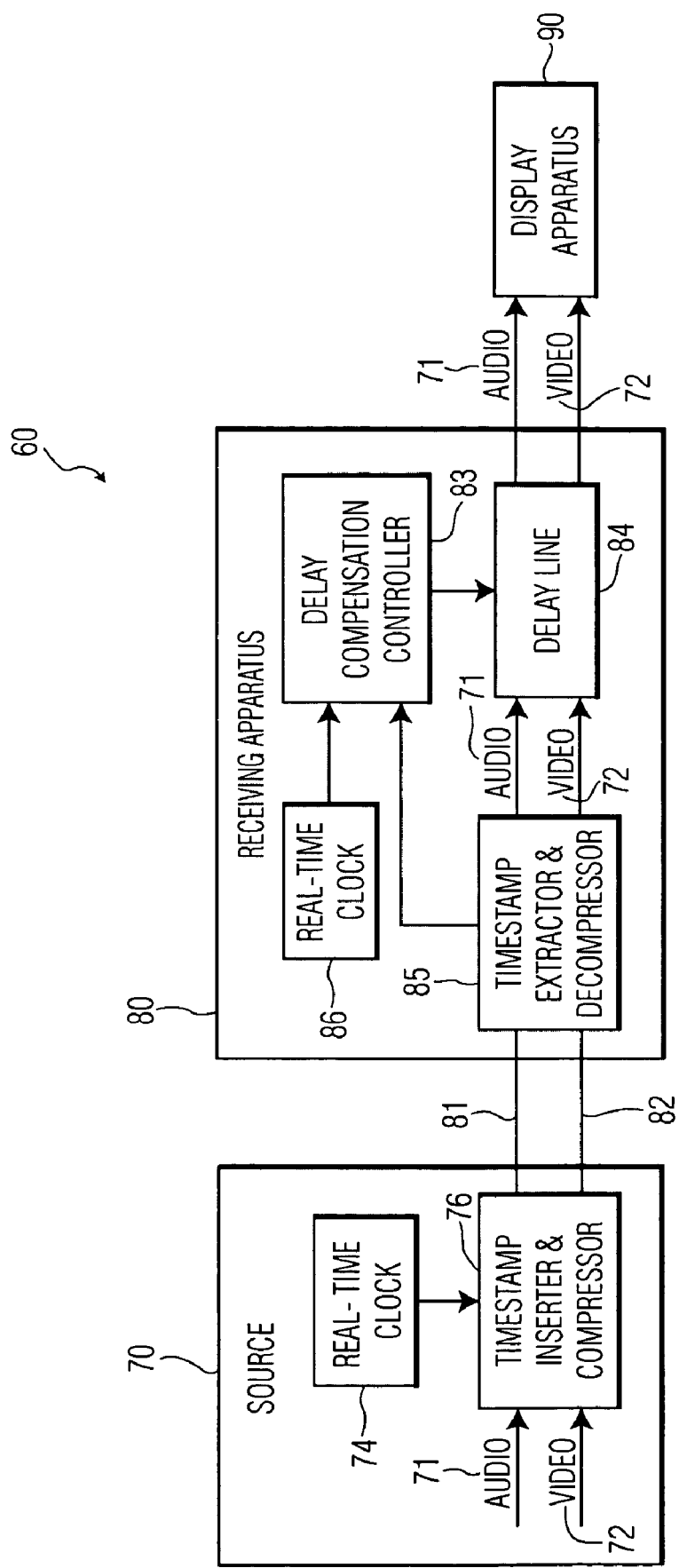
FIG. 3 is a block diagram of an automated system for synchronizing signals using timestamps, in accordance with embodiments of the present invention.

FIG. 3 is a block diagram of an automated system 60 for synchronizing signals, in accordance with embodiments of the present invention. The system 60 is adapted to receive an audio signal 71 and a video signal 72 from a source 70. The source 70 functions as a sender of the audio signal 71 on audio channel 81, and as a sender of the video signal 72 on video channel 82, to the system 60. The audio signal 71 and the video signal 72 are each in either in an uncompressed format or in a compressed format, as sent by the source 70 and as received by the system 60. The video signal 72 is either in an uncompressed format or in a compressed format, as sent by the source 70 and as received by the system 60. The source 70 includes a real-time clock 74 which may synchronize 76 the audio signal 71 with the video signal 72, although said synchronization between the audio signal 71 and the video signal 72 may alternatively be achieved by other methods such as, inter alia, utilizing a "genlock" signal at the source 70. If either or both of the audio signal 71 and the video signal 72 are sent to the system 60 in a compressed format, the synchronization between the audio signal 71 and the video signal 72 is effectuated prior to said compression.

The timestamp inserter 76 inserts a plurality of timestamps into each of the audio signal 71 and the video signal 72. These timestamps will be subsequently utilized by the receiving apparatus 80 to synchronize the audio signal 71 and the video signal 72 if said signals arrived at the receiving apparatus 80 out of synch with each other. The timestamp content to be inserted in a given signal (i.e., the audio signal 71 or the video signal 72) depends on whether the given signal to be sent by the source to the receiving apparatus 80 is uncompressed or compressed. If the given signal is uncompressed, then the timestamp includes a time (e.g., a time read from the real-time clock 74) that is inserted into the given signal as the given signal is being transmitted to the receiving apparatus 80, or alternatively when the given signal is being propagated at the rate of transmission at which the given signal is intended to be subsequently played back. The timestamp may be stored in a location in the given uncompressed signal from which the timestamp can be later retrieved. For example, if the given uncompressed signal is a video signal, then the timestamp can be stored in, inter alia, blanking intervals between frames. As another example, if the given uncompressed signal is a audio signal, then the timestamp can be stored as a watermark in the audio signal. The watermark may include audio frequencies and/or audio amplitudes that lie outside the range of human hearing.

If the given signal is compressed, then the timestamp includes: 1) a time (e.g., as read from the real-time clock 74), wherein the time corresponds to a location (L) in an uncompressed signal which was compressed to form the given signal; and 2) an identification of said location (L) in the uncompressed signal. The location (L) needs to be in the timestamp because there is no precise correlation between the bits of a compressed signal and locations in the corresponding uncompressed signal. Thus the location (L) compensates for said lack of precise correlation. FIG. 1 indicates that the timestamp inserter 76 comprises the compression functionality if compression is relevant. This means that the timestamp may be inserted into the given signal while compression is occurring. Alternatively, the given signal may be compressed first followed later by insertion of the timestamp into the compressed signal. The timestamp may be stored in any location in the given compressed signal from which the timestamp can be later retrieved. For example, the timestamp may be inserted between two logical compression units of the compressed signal. FIG. 6 is a table summarizing the timestamp contents for the uncompressed signal format and the compressed signal format.

The system 60 includes a receiving apparatus 80 and a display apparatus 90. Although not shown, the system 60 may also include a user apparatus analogous to the user apparatus shown in FIG. 1 and described supra. If the system 60 includes such a user apparatus, then the system 60 would have both manual capabilities and the automated capabilities described infra.

As explained supra, the audio signal 71 and the video signal 72 may arrive at the receiving apparatus 80 out of time synchronization with each other. The receiving apparatus 80 includes a real-time clock 86, a timestamp extractor 85, a delay compensation controller 83, and a delay line 84. The delay compensation controller 83 is coupled to the real-time clock 86, the delay line 84, and the timestamp extractor 85. The timestamp extractor 85 is coupled to the delay line 84. As indicated in FIG. 3, the timestamp extractor 85 also includes decompression means for decompressing whichever of the audio signal 71 and the video signal 72 has been received by the receiving apparatus 80 in compressed format.

Regardless of whether the audio signal 71 and the video signal 72 are received by the receiving apparatus 80 in uncompressed format or in compressed format, the timestamp extractor 85 extracts the timestamps from within the audio signal 71 and the video signal 72. The timestamps had been independently inserted into the audio signal 71 and the video signal 72 by the timestamp inserter 76, and the timestamps are independently extracted from the audio signal 71 and the video signal 72 by the timestamp extractor 85.

The display apparatus 90, (which may also include a control such as the control 42 shown in FIG. 1 and described supra) may be any type of apparatus known by one of ordinary skill in the art as being capable of displaying the pertinent signals. For example, the display apparatus 90 may comprise a speaker for displaying the audio signal 71. As another example, the display apparatus 90 may comprise a television screen or computer monitor for displaying the video signal 72. The display apparatus 90 is coupled to the delay line 84 of the receiving apparatus 80.

After having each timestamp extracted by the timestamp extractor 85, the audio signal 71 and the video signal 72 are transmitted into the delay line 84 where one or both of said signals are subject to being delayed or slowed down under control of the delay compensation controller 83. The delay line 84 may include one or more buffers for storing the audio signal 71 and the video signal 72. The audio signal 71 and the video signal 72 are transmitted from the delay line 84 into the display apparatus 90. The display apparatus 90 is adapted to display the audio signal 71 and the video signal 72.

The delay compensation controller 83 may effectuate a reduction in the time rate of displaying the one signal (i.e., the "advanced" signal) of the audio signal 71 and the video signal 72 that is ahead of the other remaining signal (i.e., the "retarded" signal), so as to time-synchronize the displaying of the audio signal 71 and the video signal 72 on the display apparatus 90. This synchronization is accomplished in accordance with FIG. 4, which is a flow chart describing synchronization of signals using timestamps, in accordance with embodiments of the present invention.

Figure 4:
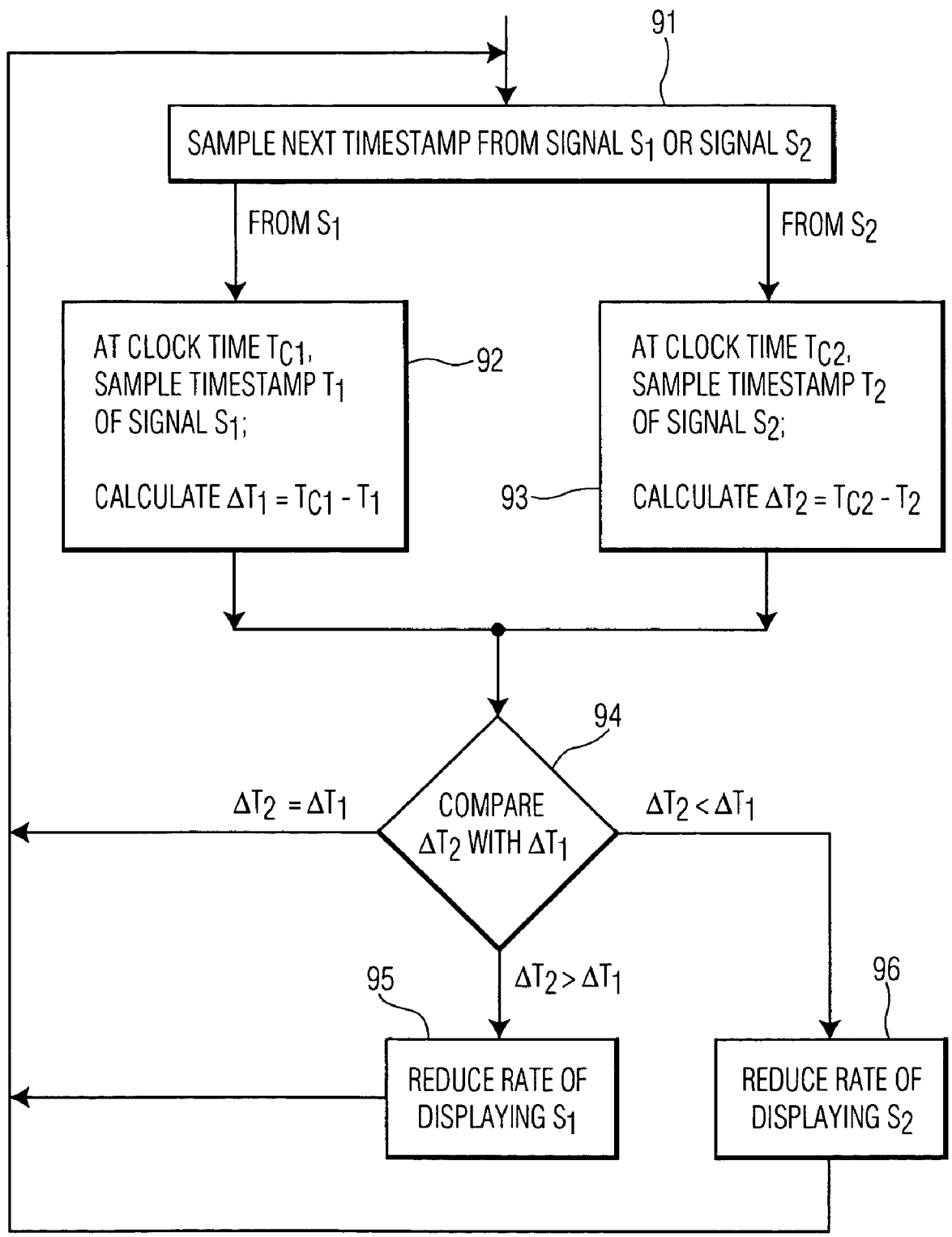
FIG. 4 is a flow chart describing synchronisation of signals using timestamps in conjunction with the automated system of FIG. 3, in accordance with embodiments of the present invention.

The flow chart of FIG. 4 comprises steps 91-96. As stated supra, the audio signal 71 and the video signal 72 have their timestamps extracted independently after the audio signal 71 and the video signal 72 enter the receiving apparatus 80 and are decompressed (if received in compressed format). For simplicity, let S1 represent the audio signal 71 and let S2 represent the video signal 72. In step 91, the delay compensation controller 83 samples a timestamp from signal S1 or a timestamp from signal S2. Let the symbol T1 denote a normalized time of the timestamp from signal S1, wherein the normalized time T1 is the actual time of the timestamp plus an additive constant C1 that normalizes the timestamps of the signal S1 to the time frame of the real-time clock 86. For example, if the first timestamp existing in the signal S1 is "10:00 AM" and is processed by the delay compensation controller 83 when the delay compensation controller 83 reads the time on the real-time clock 86 as "9:30 AM", then the additive constant C1 of 30 minutes of time is added to every timestamp value extracted from the signal S1 for normalization purposes. The parameter T1 is the timestamp value of time, relating to the signal S1, after said normalization. Said normalization makes it possible to make meaningful comparisons between the timestamps of the signal S1 with the real-time clock 86 in order to detect whether the various timestamps of the signal S1 are out of synch with the real-time clock 86. Similarly, let the symbol T2 denote a normalized time of the timestamp from signal S2, wherein the normalized time T2 is the actual time of the timestamp plus an additive constant C2 that normalizes the timestamps of the signal S2 to the time frame of the real-time clock 86. The additive constants C1 and C2 are independent of each other and may be positive, negative, or zero.

Step 92 compares the normalized timestamp time T1 of the signal S1 with the corresponding time TC1 on the clock 86. If T1 is in synch with the clock 86, then T1 equals TC1. Accordingly, step 92 calculates ΔT1=TC1−T1, which represents an amount of time by which T1 is out of synch with the clock 86. If ΔT1>0, then the signal S1 lags the clock 86 at time T1. If ΔT1<0, then the signal S1 leads the clock 86 at time T1. If ΔT1=0, then the signal S1 is in synch with the clock 86 at time T1.

Step 93 compares the normalized timestamp time T2 of the signal S2 with the corresponding time TC2 on the clock 86. If T2 is in synch with the clock 86, then T2 equals TC2. Accordingly, step 92 calculates ΔT2=TC2−T2, which represents an amount of time by which T2 is out of synch with the clock 86. If ΔT2>0, then the signal S2 lags the clock 86 at time T2. If ΔT2<0, then the signal S2 leads the clock 86 at time T2. If ΔT2=0, then the signal S2 is in synch with the clock 86 at time T2. FIG. 5 is a time line illustrating the definitions of various parameters T1, TC1, ΔT1, T2, TC2, and ΔT2.

Step 94 compares ΔT2 with ΔT1 to determine whether signal S2 is in synch with signal S1. If ΔT2=ΔT1, then signal S2 is in synch with signal S1 and processing returns to step 91. If ΔT2>ΔT1, then signal S2 is out of synch with signal S1 such that signal S2 lags signal S1 and the rate of displaying signal S1 is reduced in step 95 by delay compensation controller 83 followed by returning to step 91. If ΔT2<ΔT1, then signal S2 is out of synch with signal S1 such that signal S1 lags signal S2 and the rate of displaying signal S2 is reduced in step 95 by delay compensation controller 83 followed by returning to step 91.

Step 94 may be performed every time a new value of ΔT1 or ΔT2 is calculated in step 92 or step 93. Alternatively, step 94 may be performed selectively and not following every calculation of ΔT1 or ΔT2. The time retardation of S1 in step 95 or of S2 in step 96 may be equal to ΔT2−ΔT1 or ΔT1−ΔT2, respectively, which neglects the fact that the comparison between T1 and T2 may be made at different times on the real-time clock 86; i.e., when TC1 [1] TC2. Improved accuracy may be obtained by using interpolation or extrapolation on T1 to adjust ΔT1 to compensate for TC1 differing from TC2, or by using interpolation or extrapolation on T2 to adjust ΔT2 to compensate for TC2 differing from TC1. The scope of the present invention includes any numerical method of effectuating a time-retardation of signal S1 or of signal S2 as would be apparent to one of ordinary skill in the art.

The time rate of displaying the advanced signal may be reduced continuously such as by having the delay compensation controller 83 reduce the transmission rate or display rate of the advanced signal. (i.e., the one signal of the audio signal 71 and the video signal 72 that is ahead of the other remaining signal). The time rate of displaying the advanced signal may alternatively be reduced by having the delay compensation controller 83 introduce a time delay gap in the advanced signal via freezing the advanced signal in the one or more buffers of the delay line 84 for the period of the time delay gap. The time delay gap is an interval of time during which the advanced signal is held in suspension and is not being further transmitted.

The present invention is generally applicable to any situation in which different signals transmitted from a source to a receiver are time synchronized at the receiver. As an example, the present invention may be applied to a video game in which the audio and video signals for the video game may arrive at receiver (where one or more players of the game are located) out of time synchronization with respect to each other. The out-of-synch signal conditions may occur periodically so that the corrective action disclosed by the present invention (i.e., reducing the rate of displaying the audio signal or the video signal) may be applied conditionally. Depending on the nature of the video game, it may even be desirable at times not to take corrective action according to the present invention when out-of-synch signal conditions occur under some special circumstances relating to the video game.

While embodiments of the present invention have been described herein for purposes of illustration, many modifications and changes will become apparent to those skilled in the art. Accordingly, the appended claims are intended to encompass all such modifications and changes as fall within the true spirit and scope of this invention

The invention claimed is:

1. A method for synchronizing signals, comprising:
  receiving, from a source, a first signal and a second signal by a receiving apparatus of a receiving system, the first and second signals to be synchronously displayed on a display apparatus of the receiving system, the first and second signals having been time-synchronized at the source, the first signal having content of a first modality and a first plurality of time stamps originating from the source, the second signal having content of a second modality and a second plurality of time stamps originating from the source, the second plurality of time stamps being synchronized with the first plurality of time stamps;
  determining at a plurality of times on a real-time clock at the receiving system whether the first and second signals are time-synchronized relative to the clock, said determining being based on analyzing the first and second plurality of time stamps in relation to the clock; and
  reducing the time rate of displaying one of the first signal and the second signal when said determining determines that the first and second signals are not time-synchronized relative to the clock such that the one is time advanced relative to the remaining other of the first signal and the second signal, said reducing being directed to time-synchronizing said displaying of the first and second signals on the display apparatus.

2. The method of claim 1,
  wherein the first signal is in an uncompressed format as received by the receiving apparatus, wherein each timestamp of the first plurality of timestamps includes a time corresponding to a location in the first signal at which said timestamp of the first plurality of timestamps is positioned,
  wherein the second signal is in an uncompressed format as received by the receiving apparatus, and wherein each timestamp of the second plurality of timestamps includes a time corresponding to a location in the second signal at which said timestamp of the second plurality of timestamps is positioned.

3. The method of claim 1,
  wherein the first signal is in a compressed format as received by the receiving apparatus, wherein each timestamp of the first plurality of timestamps includes a time corresponding to a location in a first uncompressed signal which was compressed at the source to form the first signal, wherein said timestamp of the first plurality of timestamps further includes an identification of said location in the first uncompressed signal,
  wherein the second signal is in a compressed format as received by the receiving apparatus, wherein each timestamp of the second plurality of timestamps includes a time corresponding to a location in a second uncompressed signal which was compressed at the source to form the second signal, and wherein said timestamp of the second plurality of timestamps further includes an identification of said location in the second uncompressed signal.

4. The method of claim 1,
  wherein the first signal is in an uncompressed format as received by the receiving apparatus, wherein each timestamp of the first plurality of timestamps includes corresponding to a location in the first signal at which said timestamp of the first plurality of timestamps is positioned,
  wherein the second signal is in a compressed format as received by the receiving apparatus, wherein each timestamp of the second plurality of timestamps includes a time corresponding to a location in an uncompressed signal which was compressed at the source to form the second signal, and wherein said timestamp of the second plurality of timestamps further includes an identification of said location in the uncompressed signal.

5. The method of claim 1, wherein said reducing is effectuated by a delay compensation controller of the receiving apparatus.

6. The method of claim 1, wherein said reducing comprises introducing a time delay gap in the displaying of said one of the first signal and the second signal.

7. The method of claim 1, wherein said reducing does not comprise introducing a time delay gap in the displaying of said one of the first signal and the second signal.

8. The method of claim 1, wherein the first modality differs from the second modality.

9. The method of claim 8, wherein the first modality is a video modality, and wherein the second modality is an audio modality.

10. The method of claim 8, wherein the first modality is a video modality, and wherein the second modality is an text modality.

11. The method of claim 8, wherein the first modality is a text modality, and wherein the second modality is an audio modality.

12. The method of claim 1, wherein said receiving the first signal and the second signal comprises receiving the first signal and the second signal on separate channels.

13. The method of claim 1, wherein said receiving the first signal and the second signal comprises receiving the first signal and the second signal as not multiplexed with each other.

14. The method of claim 1, wherein said receiving the first signal and the second signal comprises receiving the first signal and the second signal as multiplexed but not time-synchronized with each other.

15. A system for synchronizing signals, comprising:
  receiving means for receiving, from a source, a first signal and a second signal by a receiving apparatus of a receiving system, the first and second signals to be synchronously displayed on a display apparatus of the receiving system, the first and second signals having been time-synchronized at the source, the first signal having content of a first modality and a first plurality of timestamps originating from the source, the second signal having content of a second modality and a second plurality of timestamps originating from the source, the second plurality of time stamps being synchronized with the first plurality of time stamps;

determining means for determining at a plurality of times on a real-time clock $C_R$ at the receiving system whether the first and second signals are time-synchronized relative to the clock $C_R$, said determining being based on analyzing the first and second plurality of timestamps in relation to the clock $C_R$; and reducing means for reducing the time rate of displaying one of the first signal and the second signal when said determining determines that the first and second signals are not time-synchronized relative to the clock $C_R$ such that the one is time advanced relative to the remaining other of the first signal and the second signal, said reducing being directed to time-synchronizing said displaying of the first and second signals on the display apparatus.

16. The system of claim 15,
wherein the first signal is in an uncompressed format as received by the receiving apparatus, wherein each timestamp of the first plurality of timestamps includes a time corresponding to a location in the first signal at which said timestamp of the first plurality of timestamps is positioned,
wherein the second signal is in an uncompressed format as-received by the receiving apparatus, and wherein each timestamp of the second plurality of timestamps includes a time corresponding to a location in the second signal at which said timestamp of the second plurality of timestamps is positioned.

17. The system of claim 15,
wherein the first signal is in an uncompressed format as received by the receiving apparatus, wherein each timestamp of the first plurality of timestamps includes a time corresponding to a location in a first uncompressed signal which was compressed at the source to form the first signal, wherein said timestamp of the first plurality of timestamps further includes an identification of said location in the first uncompressed signal,
wherein the second signal is in an uncompressed format as received by the receiving apparatus, wherein each timestamp of the second plurality of timestamps includes a time corresponding to a location in a second uncompressed signal which was compressed at the source to form the second signal, and wherein said timestamp of the second plurality of timestamps further includes an identification of said location in the second uncompressed signal.

18. The system of claim 15,
wherein the first signal is in an uncompressed format as received by the receiving apparatus, wherein each timestamp of the first plurality of timestamps includes a time corresponding to a location in the first signal at which said timestamp of the first plurality of timestamps is positioned,
wherein the second signal is in an uncompressed format as received by the receiving apparatus, wherein each timestamp of the second plurality of timestamps includes a time corresponding to a location in a second-uncompressed signal which was compressed at the source to form the second signal, and wherein said timestamp of the second plurality of timestamps further includes an identification of said location in the second uncompressed signal.

19. The system of claim 15, wherein said reducing is effectuated by a delay compensation controller of the receiving apparatus.

20. The system of claim 15, wherein said reducing comprises introducing a time delay gap in the displaying of said one of the first signal and the second signal.

21. The system of claim 15, wherein said reducing does not comprise introducing a time delay gap in the displaying of said one of the first signal and the second signal.

22. The system of claim 15, wherein the first modality differs from the second modality.

23. The system of claim 22, wherein the first modality is a video modality, and wherein the second modality is an audio modality.

24. The system of claim 22, wherein the first modality is a video modality, and wherein the second modality is an text modality.

25. The system of claim 22, wherein the first modality is a text modality, and wherein the second modality is an audio modality.

26. The system of claim 15, wherein said receiving means comprises means for receiving the first signal and the second signal on separate channels.

27. The system of claim 15, wherein said receiving means comprises means for receiving the first signal and the second signal as not multiplexed with each other.

28. The system of claim 15, wherein said receiving means comprises means for receiving the first signal and the second signal as multiplexed but not time-synchronized with each other.

* * * * *